(12) United States Patent
Inam et al.

(10) Patent No.: US 12,443,176 B2
(45) Date of Patent: Oct. 14, 2025

(54) INTELLIGENT TASK OFFLOADING

(71) Applicant: Telefonaktiebolaget LM Ericsson (publ), Stockholm (SE)

(72) Inventors: Rafia Inam, Västerås (SE); Alberto Hata, Barueri (BR); Franco Ruggeri, Solna (SE); Ahmad Ishtar Terra, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 239 days.

(21) Appl. No.: 18/278,484

(22) PCT Filed: Feb. 26, 2021

(86) PCT No.: PCT/EP2021/054939
§ 371 (c)(1),
(2) Date: Aug. 23, 2023

(87) PCT Pub. No.: WO2022/179710
PCT Pub. Date: Sep. 1, 2022

(65) Prior Publication Data
US 2024/0053736 A1   Feb. 15, 2024

(51) Int. Cl.
    G05B 19/418        (2006.01)
(52) U.S. Cl.
    CPC ... G05B 19/41895 (2013.01); G05B 19/4185 (2013.01); *G05B 2219/14006* (2013.01)
(58) Field of Classification Search
    CPC ........ G05B 19/41895; G05B 19/41185; G05B 2219/14006
    See application file for complete search history.

(56) References Cited

FOREIGN PATENT DOCUMENTS

| WO | 2021021008 A1 | 2/2021 |
| WO | 2022167091 A1 | 8/2022 |

OTHER PUBLICATIONS

Hinchali, Sandeep et al., "Network Offloading Policies for Cloud Robotics: a Learning-based Approach," rXiv:1902.05703v1, Feb. 15, 2019, 11pages. (Year: 2019).*
International Search Report and Written Opinion of the International Searching Authority, PCT/EP2021/054939, mailed Dec. 2, 2021, 15 pages.
Chinchali, Sandeep et al., "Network Offloading Policies for Cloud Robotics: a Learning-based Approach," arXiv:1902.05703v1, Feb. 15, 2019, 11 pages.

(Continued)

*Primary Examiner* — Thomas E Worden
*Assistant Examiner* — Jay Khandpur
(74) *Attorney, Agent, or Firm* — Sage Patent Group

(57) ABSTRACT

A method of operating a device that interacts with a physical environment includes determining to take an action on the physical environment wherein the action is based on an output of a computing task, generating a risk level that estimates a risk of physical harm associated with taking the action within the physical environment, obtaining a performance indicator of a communication network between the device and a remote computing device, and determining, based on the risk level and the performance indicator, whether to offload the computing task to the remote computing device or to perform the computing task locally. Related devices are also disclosed.

14 Claims, 8 Drawing Sheets

(56) References Cited

OTHER PUBLICATIONS

University of Massachusetts, Amherst, USA, "Dec-POMDP overview," downloaded Aug. 18, 2021, 2 pages.
Huang, Binbin et al., "Security and Cost-Aware Computation Offloading via Deep Reinforcement Learning in Mobile Edge Computing," Wireless Communications and Mobile Computing, 2019 Article ID. 3816237, 21 pages.
Zhou, Conghao et al., "Deep Reinforcement Learning for Delay-Oriented IoT Task Scheduling in Sagin," IEEE Transactions on Wireless Communications, Feb. 2021, vol. 20, No. 2, 15 pages.
Alshiekh, Mohammed et al., "Safe Reinforcement Learning via Shielding," Thirty-Second AAAI Conference on Artificial Intelligence, Apr. 2018, arXiv:1708.08611v2, Sep. 3, 2017, 23 pages.
Hausknecht, Matthew et al., "Deep Recurrent Q-Learning for Partially Observable MDPs", arXiv: 1507.06527v4, Jan. 11, 2017, 7 pages.
Mihatsch, Oliver et al., "Risk-Sensitive Reinforcement Learning," Machine Learning, 2002, No. 49, 24 pages.
Apostolopoulos, Pavlos Athanasios et al., "Cognitive Data Offloading in Mobile Edge Computing for Internet of Things," Digital Object Identifier, 10.1109/ACCESS.2020.2981837, 14 pages.
Apostolopoulos, Pavlos Athanasios et al., "Risk-Aware Data Offloading in Multi-Server Multi-Access Edge Computing Environment," IEEE/ACM Transactions on Networking, Jun. 2020, vol. 28, No. 3, 14 pages.
Hao, Xiaoyu et al., "A Risk-Sensitive Task Offloading Strategy for Edge Computing in Industrial Internet of Things," EURASIP Journal on Wireless Communications and Networking (in Review), arXiv:2101.05946v1, Jan. 15, 2021, 14 pages.

\* cited by examiner

INTELLIGENT TASK OFFLOADING

CROSS REFERENCE TO RELATED APPLICATIONS

This application is a 35 U.S.C. § 371 national stage application of PCT International Application No. PCT/EP2021/054939 filed on Feb. 26, 2021, the disclosure and content of which is incorporated by reference herein in its entirety.

BACKGROUND

The present disclosure relates to autonomous devices. In particular, the present disclosure relates to task offloading from autonomous devices.

The introduction of connected autonomous devices in production environments has increased the flexibility of operating such facilities. Autonomous devices can include fixed robots (e.g. robotic arms), mobile robots and automated guided vehicles (AGVs) which can have a close interaction with humans and other machines. When having such interactions, safety must be guaranteed so as not to cause injuries to humans or damage to themselves or other devices.

It is anticipated that in the future there may be hundreds or even thousands of autonomous devices inside a factory. Controlling and coordinating the interactions of so many devices in the same environment may require a substantial amount of computing power, which may be costly. The distribution of computing load may provide a straightforward solution to reduce deployment costs and to facilitate the coordination of the devices. A distributed computing arrangement may also enable the devices, which have constrained hardware resources, to run state-of-the-art methods by taking advantage of computing resources provided by a remote computing device, such as an edge computing or fog- or cloud-based infrastructure. Consequently, by offloading device processing needs to a cloud-based or edge computing device, it may be possible for an autonomous device to perform more complex tasks in a more precise manner.

To enable a distributed computing arrangement, a communication infrastructure with high reliability, low latency, high coverage and high capacity is needed. However, depending on the network load, it is not always possible to fulfill all these requirements.

REFERENCES

[1] P. A. Apostolopoulos, E. E. Tsiropoulou and S. Papavassiliou, "Cognitive Data Offloading in Mobile Edge Computing for Internet of Things," in IEEE Access, vol. 8, pp. 55736-55749, 2020, doi: 10.1109/AC-CESS.2020.2981837.
[2] X. Hao, R. Zhao, T. Yang, Y. Hu, B. Hu and Y. Qiu, "A Risk-Sensitive Task Offloading Strategy for Edge Computing in Industrial Internet of Things" EURASIP Journal on Wireless Communications and Networking (in Review), 2021, doi: 10.21203/rs.3.rs-101256/v1.

SUMMARY

A method of operating a device that interacts with a physical environment according to some embodiments includes determining to take an action on the physical environment, wherein the action is based on an output of a computing task. The method generates a risk level that estimates a risk of physical harm associated with taking the action within the physical environment, obtains a performance indicator of a communication network between the device and a remote computing device, and determines, based on the risk level and the performance indicator, whether to offload the computing task to the remote computing device or to perform the computing task locally.

The method may further include, in response to determining to offload the computing task to the remote computing device, transmitting task input data to the remote computing device, receiving task output data from the remote computing device, and taking the action on the physical environment based on the task output data received from the remote computing device.

The method may further include obtaining a set of task input data for performing the computing task, comparing the task input data for performing the computing task with a previous set of task input data for performing the same computing task, and deciding to use a set of task output data that was generated based on the previous set of task input data instead of offloading the computing task to the remote device or performing the computing task locally.

The performance indicator of the communication network comprises at least one of a throughput, a round-trip-time, a bandwidth and a latency.

Deciding whether to offload the computing task to the remote computing device or to perform the computing task locally is performed using a reinforcement learning agent that evaluates a reward for offloading the computing task to the remote device.

The reward is calculated based on a latency reward $r_l$, that is based on an amount of time needed to perform the computing task, an energy reward $r_e$ that is based on an amount of energy needed to perform the computing task, and an accuracy reward $r_a$ that is based on an accuracy of the computing task.

The latency reward $r_l$ is defined as $r_l = w_l \times 1/L$, where $w_l$ is a weight that indicates a relative importance of the latency reward compared to other reward factors and L is a total latency associated with performing the computing task, including a communication latency and an execution latency.

The communication latency comprises a time required to transmit a set of task input data to a task processing module that will perform the computing task and to receive a set of output data from the task processing module, and wherein the execution latency comprises a time required for the task processing module to complete the computing task.

The energy reward is defined as $r_e = w_e \times 1/E$ where E is an amount of energy spent to perform the computing task and $w_e$ is a weight that indicates a relative importance of the energy reward compared to other reward factors.

The accuracy reward $r_a$ is equal to zero if the computing task is performed locally and is equal to a non-zero number if the computing task is performed by the remote computing device.

The reward is calculated as reward=$(risk_{value}+1) \times (r_l+r_a) + r_e$ where $risk_{value}$ is the risk level.

The reward is further calculated based on temporal coherence reward that is based on a similarity between a previous task input to a current task input.

The temporal coherence reward is calculated as $r_T = (temporal_{coherence}^4 - 1) \times reward_{partial}$ where $temporal_{coherence}$ is the temporal coherence and $reward_{partial}$ is a reward calculated based on the risk level, the latency reward, the accuracy reward and the energy reward.

The previous task input and the current task input may include images of the physical environment, and the temporal coherence may be calculated based on mutual information of the images of the physical environment.

The mutual information of the images of the physical environment is obtained by calculating an entropy of each image and a joint entropy of the images and subtracting the entropy of each image from the joint entropy.

Generating the risk level may include detecting objects within the physical environment; generating a semantic representation of the physical environment, wherein the semantic representation of the physical environment includes properties of the detected objects; classifying the detected objects; and generating the risk level based on the properties and classifications of the objects. The semantic representation may include a scene graph.

Some embodiments provide a device configured to perform operations including determining to take an action on the physical environment, wherein the action is based on an output of a computing task. The device generates a risk level that estimates a risk of physical harm associated with taking the action within the physical environment, obtains a performance indicator of a communication network between the device and a remote computing device, and determines, based on the risk level and the performance indicator, whether to offload the computing task to the remote computing device or to perform the computing task locally.

A device according to some embodiments includes a processing circuit and a memory coupled to the processing circuit. The memory includes computer readable program instructions that, when executed by the processing circuit, cause the device to perform operations including determining to take an action on the physical environment, wherein the action is based on an output of a computing task. The operations further include generating a risk level that estimates a risk of physical harm associated with taking the action within the physical environment, obtaining a performance indicator of a communication network between the device and a remote computing device, and determining, based on the risk level and the performance indicator, whether to offload the computing task to the remote computing device or to perform the computing task locally.

Some embodiments provide a computer program including program code to be executed by processing circuitry of a device, whereby execution of the program code causes the device to perform operations including determining to take an action on the physical environment, wherein the action is based on an output of a computing task. The operations further include generating a risk level that estimates a risk of physical harm associated with taking the action within the physical environment, obtaining a performance indicator of a communication network between the device and a remote computing device, and determining, based on the risk level and the performance indicator, whether to offload the computing task to the remote computing device or to perform the computing task locally.

A computer program product comprising a non-transitory storage medium including program code to be executed by processing circuitry of a device, whereby execution of the program code causes the device to perform operations including determining to take an action on the physical environment, wherein the action is based on an output of a computing task. The operations further include generating a risk level that estimates a risk of physical harm associated with taking the action within the physical environment, obtaining a performance indicator of a communication network between the device and a remote computing device, and determining, based on the risk level and the performance indicator, whether to offload the computing task to the remote computing device or to perform the computing task locally.

A device according to some embodiments includes a processing circuit that determines to take an action on a physical environment, wherein the action is based on an output of a computing task. The device further includes a risk analysis module that generates a risk level that estimates a risk of physical harm associated with taking the action within the physical environment, a network monitor module that obtains a performance indicator of a communication network between the device and a remote computing device, and a task offloading module that determines, based on the risk level and the performance indicator, whether to offload the computing task to the remote computing device or to perform the computing task locally.

DETAILED DESCRIPTION

Figure 1:
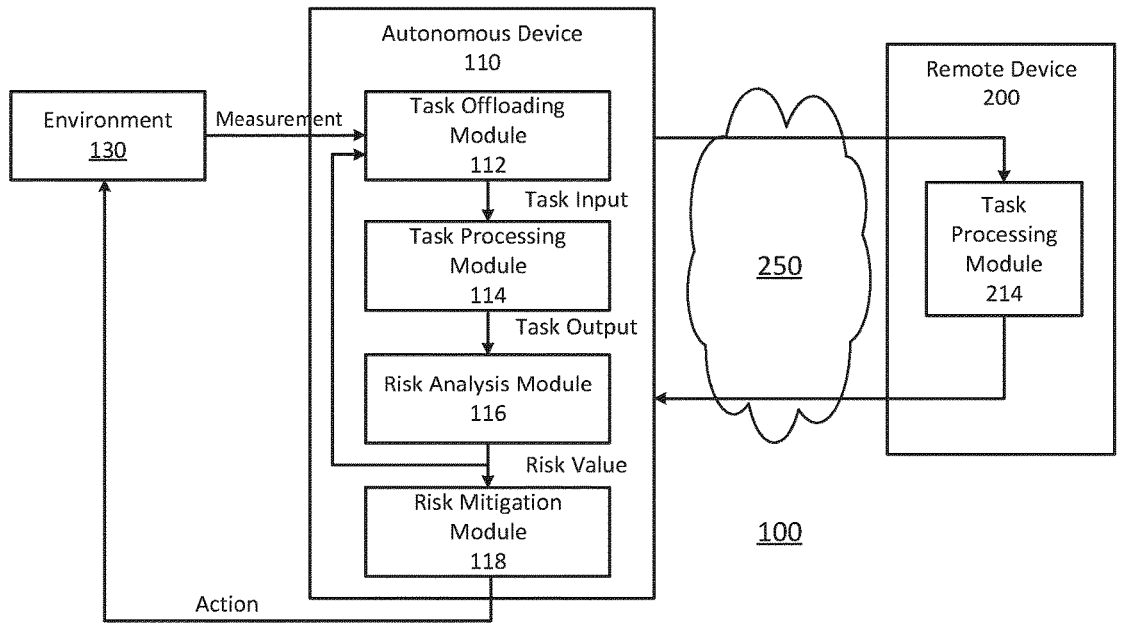
FIG. 1 illustrates a system including an autonomous device and a remote device according to some embodiments.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

As used herein, an autonomous device (also referred to as a robot or an agent) may include any device that operates according to a local control algorithm including, but not limited to, any mobile robot platform such as research robots, automated ground vehicle (AGV), autonomous vehicle (AV), service robots, mobile agents, and collaborative robots where humans and robots share the environment without having boundaries (e.g., in human-robot collaboration (HRC) operations. HRC collaboration may refer to an environment where humans and robots work closely to accomplish a task and share the work space). It will be appreciated that even though an autonomous device operates according to a local control algorithm, an autonomous device may nevertheless receive and execute commands from external devices, such as remote controllers, or via telemetry from time to time.

Embedded computing devices, such as those found in factory robots, typically have limited processing and storage capacities, which limits the ability of the device to provide a real-time response when executing state-of-the-art AI methods with high computing complexity, such as image recognition and processing. For example, autonomous vehicles may be tasked with navigating complex and noisy environments that may include obstacles, such as walls, curbs, telephone poles, humans, animals, other autonomous vehicles, etc., all of which need to be avoided while the autonomous vehicle moves to its destination. To perform obstacle avoidance, an autonomous vehicle uses one or more sensors, such as cameras, LIDAR, radar, motion sensors, etc., to obtain information about the environment. An image captured by a camera may be processed using advanced image processing techniques to identify and track potential obstacles, and to determine appropriate actions to take to avoid collisions (e.g., braking, turning, etc.). These image processing techniques may be computationally heavy, in that they may require significant computing power to perform within the time constraints needed for real-time operation of the autonomous vehicle.

Similarly, robots operating in a manufacturing environment may take actions, such as moving an articulated arm through space to perform manufacturing tasks, such as part installation, welding, soldering, and other tasks. Such robots may obtain information about their surrounding environment from sensors and use the sensor information to guide the movement of the arm. The signal processing algorithms used to track the location of objects in the environment and guide the motion of the arm may be computationally heavy.

Offloading computationally heavy algorithms to an edge or cloud-based infrastructure is one possible solution. However, offloading places high demands on the communication channel and can overload the network (especially if the data is in the form of images/video stream).

Accordingly, to enable a distributed computing arrangement, a communication infrastructure with high reliability, low latency, high coverage and high capacity is needed. One strategy to address this requirement is to base the decision to offload a computing task, such as image processing or signal processing, from a device tasks on the quality of service (QoS) available from the communication network. A computing task may be moved to the cloud or edge only when a predefined network key performance indicator (KPI) is satisfied. Otherwise, a simplified version of the task may be executed locally at the device, for example using an embedded computer.

Another potential solution is dynamically deciding whether or not to offload a particular computing task. Some embodiments described herein control task offloading from a device in a manner that considers a risk assessment that measures the possibility of causing harm to the human or damaging to the environment and also considers network performance. In particular, some embodiments determine a risk metric based on properties of the external objects with which the device may interact, such object type (static/dynamic/human), object distance, object orientation, object direction, object speed, etc., and make a decision whether or not to offload a computing task based on the risk assessment as well as the ability of the network to handle the communication burden associated with offloading the computing task.

Some embodiments provide a task offloading mechanism that incorporates safety and communication information to decide if a given computing task should be offloaded to a remote processing facility, such as an fog/edge/cloud infrastructure. This may be useful for systems and use cases in which safety is an important characteristic. Thus, the offloading decision will be influenced by both safety data and network performance metrics, such as network KPIs. The safety data, may be obtained from a risk evaluation module that receives sensor data as input (e.g. camera, LIDAR) and outputs a risk value associated with a given computing task. The task offloading decision may be supported by a reinforcement learning system that uses a reward function that has risk value and network KPI in its formulation.

Reinforcement learning (RL) is a machine learning technique for controlling a software agent (or simply, "agent") that operates in an environment. The agent makes observations of the environment and takes actions in the environment based on a policy. The agent receives a reward based on the action, and updates the policy based on the reward and the new state. The objective of the agent is to find an optimal policy that maximizes the reward obtained from the environment.

As used herein, RL may include any machine learning where an agent takes actions in an environment, which may be interpreted into a reward and a representation of a state, which are fed back into the agent including, but not limited to, deep deterministic policy gradient, asynchronous actor-critic algorithm, Q-learning with normalized advantage functions, trust region policy optimization, proximal policy optimization, etc.

FIG. 1 is a block diagram of a system 100 according to some embodiments in which an autonomous device 110 that interacts with an environment 130 can decide whether or not to offload a computing task to a remote device 200 (such as an edge or cloud computing device/service). The autonomous device 110 is provided with a task offloading module 112 that decides whether or not to offload a computing task based on measurements from the environment 130, network performance metrics of the communication network 250 between the autonomous device 110 and the remote device 200, and a risk level provided by a risk analysis module 116. The task offloading module decides 112 whether a given computing task (such as object detection) should be executed locally (on the device) or remotely (e.g., on the remote device 200).

If a decision is made to offload a computing task, the input data to the computing task ("task input"), which may be a measurement taken by one or more sensors, is transmitted to the remote device via a communication network 250. The remote device 200 includes a task processing module 214 for performing the computing task. The result of the computing task ("task output") is transmitted back to the autonomous device 110 via the communication network 250.

The autonomous device 110 includes a task processing module 114 for performing the computing task locally. However, the task processing module 114 may perform the computing task more slowly and/or with lower accuracy compared to the task processing module 214 in the remote device because, for example, the remote device 200 may have more processing resources (e.g., processor speed, available processing cores, memory, etc.) and/or the remote device 200 may not be energy-constrained as compared the autonomous device 110.

The output of task processing module 114/214 is provided to a risk analysis module 116. The risk analysis module analyzes the task output (and potentially other factors) and generates a risk level that describes a risk associated with the task output. For example, the risk level be a number that describes a level of risk associated with taking an action in response to the task output. The generation of risk levels is known. For example, a risk level may be calculated in steps by following the risk management process of ISO 31000. In some embodiments, the risk level may be generated as described in PCT Publication WO2021/021008.

The risk level is transmitted to a risk mitigation module 118, which decides on an action to take on the environment 130 based on the risk level output by the risk analysis module 116.

A potential advantage of embodiments described herein is that an offloading decision-making process may adapt to safety requirements. Therefore, situations with higher risk, where faster responses are needed, will have higher chances of having the task offloaded to remote device.

In addition, some embodiments may enable better usage of the network resources. A task tends to be executed locally when a low risk level is identified. This may avoid unnecessary overload of the network, increase the efficiency of the operation and/or reduces the usage of network resources.

Moreover, some embodiments described herein may help to preserve safety and integrity of nearby elements. As the response time of the algorithm will be adjusted according to the risk level, this induces the device to have safer interaction with humans and environment.

Some embodiments may be agnostic to the network setup. That is, they may be implemented with many different types of wireless access networks (e.g. WiFi, 4G, 5G) and with the server either on the edge or on the cloud.

Figure 2:
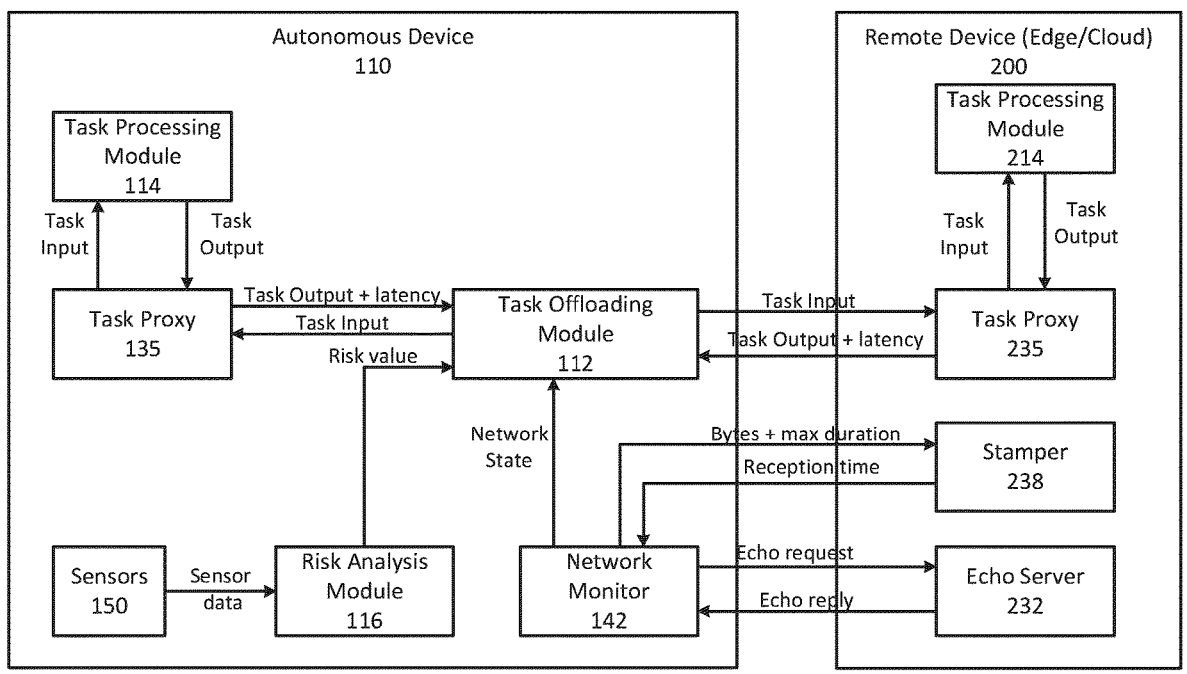
FIG. 2 illustrates a system including an autonomous device and a remote device according to some embodiments in more detail.

FIG. 2 illustrates components and operations of an autonomous device 110 and a remote device 200 in more detail. In particular, as shown in FIG. 2, an autonomous device 110 includes a task proxy 135. When the autonomous device decides to execute a task locally, the task proxy 135 receives task inputs from the task offloading module 112 and provides the task inputs to the task processing module 114. The task processing module 114 performs the requested task and provides the task output to the task proxy 135. The task proxy 135 calculates latency measurements related to the task, including an execution latency (i.e., the amount of time taken by the task processing module 114 to process the task) and a communication latency, i.e., the amount of time needed to transmit the task input to the task processing module 114 and to transmit the task output to the task offloading module 112. The task proxy provides the task output and the latency measurements to the task offloading module.

The autonomous device 110 further includes a network monitor 142 that monitors performance of the communication network 250 (FIG. 1) used to communicate with the remote device 200. The network monitor 142 may monitor one or more KPI of the network 250, such as throughput, latency, round trip time (RTT), bandwidth, etc. The network monitor 142 provides information about the condition of the network 250 to the task offloading module 112, which can use the information in determining whether or not to offload a particular task to the remote device 200. The network monitor 142 may obtain information specifically about the status of the communication link between the autonomous device 110 and the remote device 200 by communicating directly with a stamper 238 and an echo server 232 in the remote device, as described in more detail below.

The autonomous device 110 further includes a risk analysis module 116 which generates a risk level based on sensor data provided by one or more sensors 150. The sensor(s) 150 may be integral with the autonomous device 110 or may be remote sensors, such as remote cameras, motion sensors, etc., that provide data to the autonomous device 110. In some embodiments, the sensors 150 may belong to other autonomous devices which may share their sensor data with the autonomous device 110.

Inside the task offloading module 112, both the autonomous device 110 and the network 250 are monitored to determine whether a given computing task should be executed on the remote device 200. This decision is supported by a reinforcement learning (RL) in the task offloading module 112, which receives as its primary inputs the local device's safety information (i.e., the risk level) from the risk analysis module 116 and the network KPIs (e.g. RTT, bandwidth) from the network monitor 142. Using the RL model, the task offloading module 112 generates a value indicative of the feasibility to offload the task. If task offloading module 112 decides to execute the computing task remotely, the task offloading module 112 sends the task input to a task proxy 235 in the remote device 200 through the network 250. The task proxy 235 transmits the task output to the autonomous device 110 along with latency measurements as described above.

Alternatively, the task offloading module 112 may decide, based on the output of the RL model, to reuse a task output from a previous execution of the computing task based on a similarity between the current task input and previous task input. The similarity between the current task input and previous task input may be verified by temporal coherence as described in more detail below.

The input to the task offloading module 112 includes a current observation of the network environment as a continuous state space, which may include, for example, a current estimate of the round trip time (RTT) in milliseconds between the autonomous device 110 and the remote device 200 and/or the throughput (e.g., in Mbps) of the network 250 through which the autonomous device 110 and the remote device 200 communicate.

The risk level is a real value in the range [0, $risk_{max}$] that represents a level of risk of the current environment of the autonomous device 110 of causing physical harm to the autonomous device 110, to another device, or to a human by taking an action based on an algorithmic computation. The risk level is calculated by processing sensor data (e.g. camera, LIDAR, etc.) through a risk evaluation algorithm. Safer situations, such as when there is an absence of nearby humans or other objects/devices, lead to values closer to 0, whereas riskier situations (such as when humans or other objects/devices are nearby) lead to values closer to $risk_{max}$.

Temporal coherence is expressed as a percentage that represents the similarity of the current input to a previously processed input, such as the last processed input. The calculation is task-dependent.

The output of the task offloading module 112 may be one of three different choices: to perform the computing task locally using the task processing module 114 in the autonomous device 110, to offload the computing task to the task processing module 214 of the remote device 200, or to bypass processing altogether and use a previous output that was generated in response to a previous input. When a computing task is offloaded to the remote device 200, the computing task will be executed remotely. When the decision is to perform the computing task locally, task processing is performed on the hardware of the autonomous device 110, which may execute a simplified algorithm that may deliver a lower accuracy as compared to the one executed on the remote device 200. The response time of the local task processing module 114 may be faster than the response time of the remote task processing module 214 because of the communication latency of the network 250. However, the execution time of the task on the local task processing module 114 may be slower than the execution time of the remote task processing module 214, because the remote device 200 may have more computing resources available to it, such as a faster processor speed, more buffer space, more available cores/threads, etc.

The third option for the task offloading module 112 is not to compute the task output locally or remotely, but to use a previously generated output.

The task offloading module 112 operates as a deep reinforcement learning (DRL) agent that supports a continuous observation space and a discrete action space. The state-of-the-art alternatives for DRL include a deep Q-network (DQN), cross-entropy method (CEM) and state-action-reward-state-action (SARSA) model. The agent is first trained in a particular environment (the training phase) and is then deployed in a real environment that is similar to the training environment (the inference phase). The training environment includes a network with varying congestion and a scenario with varying safety requirements, which can be set up in a simulation (e.g. V-REP+ns-3). The agent may continue to learn when deployed, at the cost of overhead.

In the training phase, the agent receives a reward after each action. According to some embodiments, a reward may be defined to include different contributions, including contributions for latency, energy usage, task accuracy and temporal coherence.

The latency reward may be defined as:

$$r_l = w_l \times 1/L$$

where $w_l$ is a weight set by the user that indicates the relative importance of the latency compared to other reward factors and L is the total latency.

Latency is the time elapsed from when the autonomous device 110 decides to perform a computing task until the time the output of the task is available to the autonomous device 110. The total latency L may be calculated using the output of the task proxy 135, 235 as the sum of the communication latency (latency$_{communication}$) and the execution latency (latency$_{execution}$) as follows:

$$L = latency_{communication} + latency_{execution}$$

The energy reward may be defined as:

$$r_e = w_e \times 1/E$$

where E is the amount of energy spent to perform the computing task according to the decision and $w_e$ is a user-defined weight that indicates the relative importance of the energy compared to other reward factors. Thus, in case of computation at the remote device 200, the energy may be calculated using the output of the task proxy 235 as follows:

$$E = latency_{communication} \times power_{transmit}$$

where power$_{transmit}$ is the power consumption of the network interface card (NIC) of the autonomous device 110 needed to transmit the task input and receive the task output. In the case of local computation, energy may be is calculated as:

$$E = latency_{execution} \times power_{compute}$$

where power$_{compute}$ is the power consumption of the device's CPU.

The reward factor for task accuracy may be set as $r_a=1$ if the task was been performed on the remote device 200 (e.g., it is considered an accurate task) and $r_a=0$ otherwise. This reward only applies when the accuracy/AI-performance of the remote device 200 is considered to be higher than that of autonomous device 110. For example, the remote device 200 may use a state-of-the-art algorithm while autonomous device 110 may use a simplified algorithm to perform the same task.

According to some embodiments, a partial reward that does not include temporal coherence, is given by:

$$reward_{partial} = (risk_{value} + 1) \times (r_l + r_a) + r_e$$

A final reward may be computed as follows:

$$reward_{final} = reward_{partial} + r_t$$

where $r_t$ is a temporal coherence reward that is negative (i.e., defined as a penalty). If the computing task has been computed (not skipped), then $r_t = 0$. Otherwise, if the computing task has been skipped, then $r_t$ is calculated as:

$$r_t = (temporal_{coherence}^4 - 1) \times reward_{partial}.$$

When the current input is completely different from a previous input (i.e., temporal$_{coherence}=0$), then:

$$r_t = -reward_{partial}$$

However, when the current input is identical to a previous input (i.e., temporal$_{coherence}=1$), then:

$$r_t = 0$$

Between the minimum and maximum values of temporal coherence, $r_t$ has a degree 4 trend, so that it is close to 0 only for very high temporal coherence. In this way, the task offloading module 112 is stimulated to avoid the computation when the temporal coherence is very high.

The value of temporal$_{coherence}$ may be calculated using any function $f_c(X_t, X_{t-1}) \rightarrow [0,1]$, where X and $X_{t-1}$ are sensor data inputs obtained at time t and t−1, respectively. This function can be modeled, for example, by a Siamese network, a long short-term memory (LSTM) or any other suitable signal similarity analysis. In case of image inputs, the function can use mutual information to determine a novelty level between image pairs. The mutual information is obtained by subtracting the entropy of each image from their joint entropy as follows:

$$f_c(X_t, X_{t-1}) = H(X_t, X_{t-1}) - H(X_t) - H(X_{t-1})$$

where H(X) is the entropy of image X and is defined as:

$$H(X) = \Sigma_i^n -p(x_i) \log(p(x_i)), x_i \in X$$

The risk level scales the contribution of latency and accuracy. In fact, in case of a risky situation, the autonomous device 110 is more interested in having a good output with a small delay. Moreover, the risk level is increased by 1 (risk$_{value}+1$) to consider latency, accuracy and temporal coherence even in completely safe situations (i.e., risk$_{value}=0$). In this way, the task offloading module 112 can learn which is the best action for safe situations.

The task proxy 135, 235, is a helper module that acts as a proxy to perform the computing task and receive the task output. The task proxy 135, 235 adds latency information to the task output that is used by the task offloading module 112 to support the offloading decision. The task proxy 135, 235 is present both on the autonomous device 110 and on the remote device 200.

The inputs to the task proxy 135, 235 include observations taken from the computing task, which include the task's input (task-dependent) and a time $t_s$ when the input was sent to the task processing module 114, 214.

The output of the task proxy 135, 235 includes the task output received from the task processing module 114 and latency information as described above. In particular, the latency information includes a communication latency, which is the time spent for sending the inputs to the local task processing module 114 or remote task processing module 214. The latency calculation will consider the network communication in case of proxy on remote device 200. Alternatively, it will consider the inter-process communication in case of local proxy, and the execution latency, which is the time spent by the task processing module 114, 214 performing the computing task.

The task proxy module 135, 235 saves the time $t_r$ of reception of the task inputs and the time $t_c$ of completion of the task. The outputs can be computed as follows:

Communication latency: $\text{latency}_{communication} = t_r - t_s$

Execution latency: $\text{latency}_{execution} = t_c - t_r$

The network monitor 142 is a helper module that measures the network state. It basically evaluates the communication between the autonomous device 110 and the remote device 200. In response to a command from the task offloading module 112 to monitor the network 250, the network monitor generates as output a RTT measurement (in milliseconds) and a throughput measurement (in Mbps).

To obtain the measurements, the network monitor 142 performs a ping test (i.e. sends an ICMP echo request to an echo server 232 in the remote device 200 and waits for the ICMP echo reply). To measure the throughput, the network monitor sends a message having predetermined number of bytes (e.g., 1 MB) to a stamper 238 in the remote device and measures the elapsed time it takes for the message to be fully received. Both operations are configured with a maximum duration so that the module guarantees an output with a small delay.

The stamper 238 is a helper module that returns the reception time for a transfer of the message from the network monitor 142. The reception time will be later used by the task offloading module 112 to compute the elapsed time. The reception time is used by the network monitor 142 to calculate the throughput. Then the network monitor 142 returns RTT and throughput to the task offloading module 112.

Figure 3:
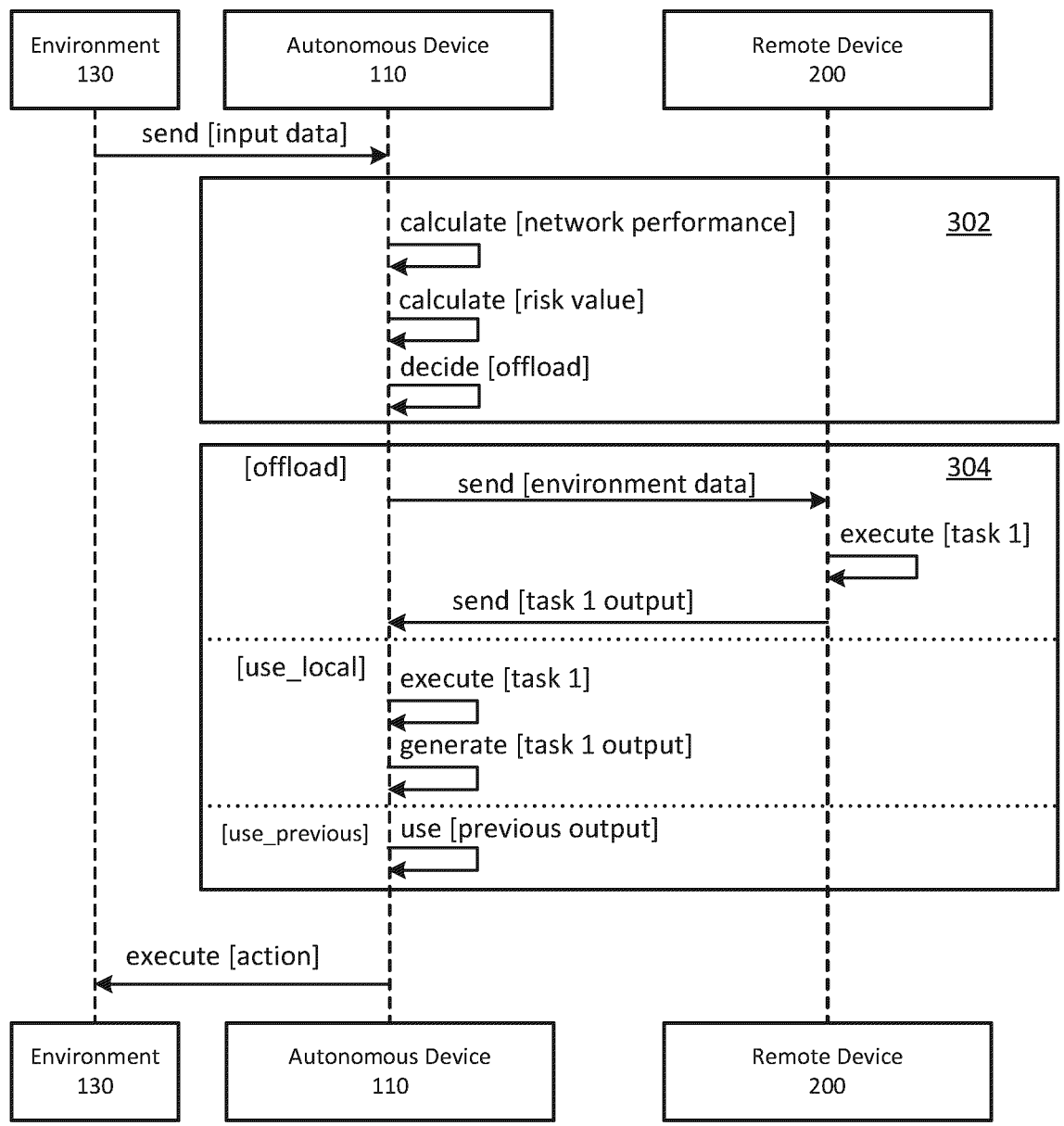
FIG. 3 illustrates operations of an autonomous device and a remote device according to some embodiments.

FIG. 3 is a sequence diagram that illustrates operations of an autonomous device 110 that includes a task offloading module 112 according to some embodiments. Referring to FIG. 3, in block 302 the autonomous device 110 receives information about its operating environment 130, for example through local or remote sensors. The autonomous device 110 then evaluates the network performance of the network 250 and calculates a risk level that estimates a risk associated with performing an action on the environment, where the action is based on the output of a computing task, such as object recognition and avoidance. For example, the action could be moving the autonomous device in a particular direction. Based on the risk level and the network performance, the autonomous device 110 decides whether the computing task that must be performed prior to taking the action will be processed remotely in a remote device 200, processed locally in the autonomous device 110 itself, or whether processed data that was previously generated may be used for performing the action.

In block 304, the autonomous device 110 executes the selected option. If the decision is to offload the task, the autonomous device 110 sends the environment data to the remote device 200, which performs the task and returns the output to the autonomous device 110. If the decision is to perform the task locally, the autonomous device 110 executes the task and generates the output itself. If the decision is to use a previous output, the autonomous device 110 uses the previous output and may discard the environment data.

The autonomous device 110 may then perform the action on the environment 130 based on the task output.

Figure 4:
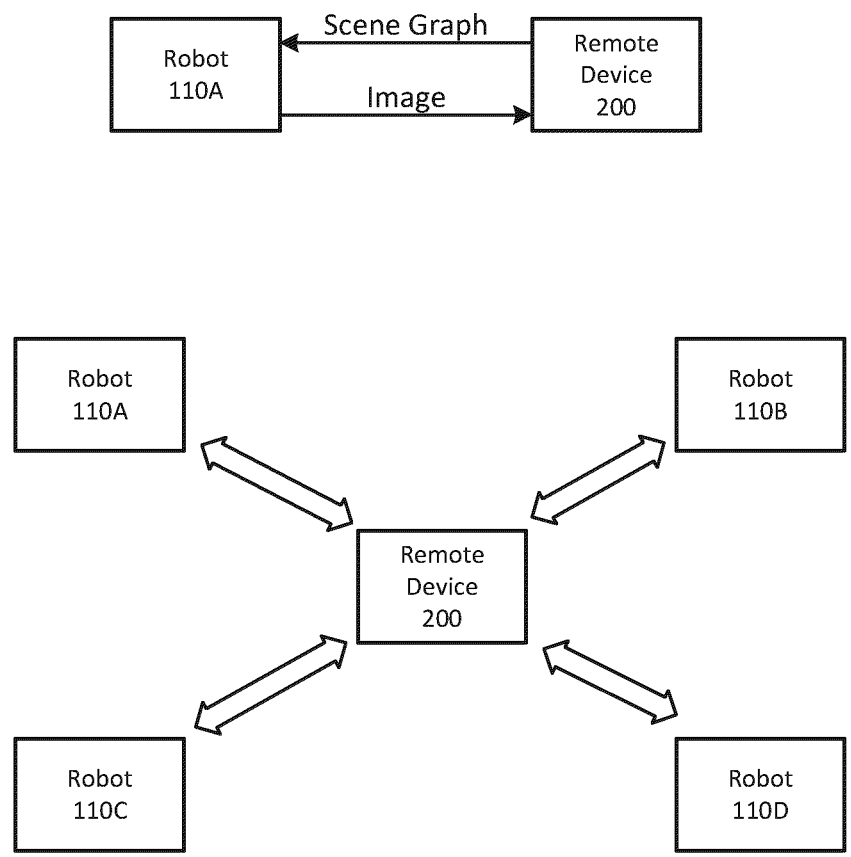
FIG. 4 illustrates an example use case of systems/methods for task offloading according to some embodiments.

An example use case scenario of human-robot collaboration (HRC) in which robots and humans work together and share a common physical space without any boundary is illustrated in FIG. 4. In HRC, safety should be guaranteed, as injuries can be caused when robots do not react in a timely and precise manner. Some embodiments described herein may be useful in other cases, such as autonomous vehicles, social robots, or simply other cases where it is desirable to dynamically offload the processing of heavy AI-algorithms.

To perform the safety analysis in the scenario illustrated in FIG. 4, the robot obtains an understanding of its surroundings, for example, using a Scene Graph Generator module as described in PCT Publication WO2021/021008. The input to this module are images from the robot's camera. The Scene Graph Generator module processes the images and generates a scene which is fed to a risk analysis module to perform a safety analysis. Such processing may be highly computationally intensive, and thus it may be desirable to have the computation performed by a remote device.

In this scenario, a mobile robot would like to offload its scene understanding tasks, in order to have higher accuracy and lower delays. Real-time responses and accurate outputs are essential for a proper collaboration with nearby humans. As the same wireless channel is shared among all resources, if all robots' tasks are offloaded at the same time, the network may become overloaded, which may result in an increase of delay and consequently, affect the safety of the robot's operation.

A solution to this problem is to use an offloading technique as described herein to dynamically decide, based on the communication and safety observations, whether to perform the scene graph generator computation locally or remotely. Since a current input may be very similar to a previous one, the task offloading module 112 can decide also to skip the computation and use the previous output, which may lead to a reduction in energy consumption.

In some embodiments, a network device, such as a radio base station, may can collect risk assessment information and provide its own risk assessment periodically to autonomous devices 110 in a network. Positioning techniques such as 3GPP Proximity Services and WiFi Ekahau Positioning Engine (or similar) can be used to identify positioning of autonomous devices 110 and other networked devices. In some embodiments, the positioning information provided by the communication infrastructure may provide a rough estimate of the risk level.

Figure 5A:
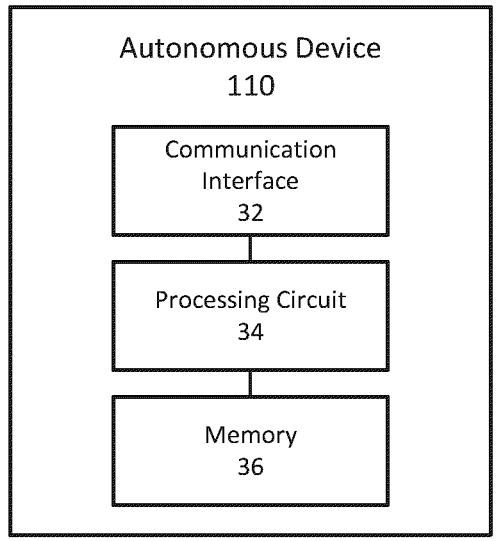
FIG. 5A illustrates components of an autonomous device according to some embodiments.

FIG. 5A is a block diagram of a device, such as an autonomous device 110. Various embodiments provide an autonomous device 110 that includes a processor circuit 34 a communication interface 32 coupled to the processor circuit, and a memory 36 coupled to the processor circuit 34. The memory 36 includes machine-readable computer program instructions that, when executed by the processor circuit, cause the processor circuit to perform some of the operations depicted described herein.

As shown, the autonomous device 110 includes a communication interface 32 (also referred to as a network interface) configured to provide communications with other devices. The device 200 also includes a processor circuit 34 (also referred to as a processor) and a memory circuit 36 (also referred to as memory) coupled to the processor circuit 34. According to other embodiments, processor circuit 34 may be defined to include memory so that a separate memory circuit is not required.

As discussed herein, operations of the autonomous device 110 may be performed by processing circuit 34 and/or communication interface 32. For example, the processing circuit 34 may control the communication interface 32 to transmit communications through the communication interface 32 to one or more other devices and/or to receive communications through network interface from one or more other devices. Moreover, modules may be stored in memory 36, and these modules may provide instructions so that when instructions of a module are executed by processing circuit 34, processing circuit 34 performs respective operations (e.g., operations discussed herein with respect to example embodiments.

Figure 5B:
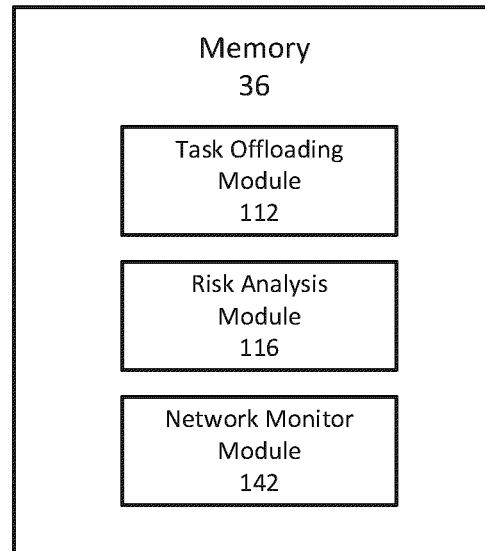
FIG. 5B illustrates functional modules stored in a memory of an autonomous device according to some embodiments.

FIG. 5B illustrates various functional modules that may be store in the memory 36 of the autonomous device 110. The modules may include a task offloading module 112, a risk analysis module 116 and a network monitor module 142 as described herein.

Figure 6:
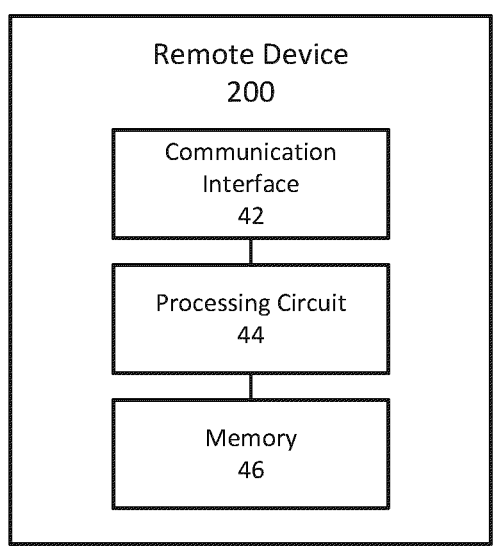
FIG. 6 illustrates components of a remote device according to some embodiments.

FIG. 6 is a block diagram of a remote device 200 to which a computation task may be offloaded. Various embodiments provide a remote device 200 that includes a processor circuit 44 a communication interface 42 coupled to the processor circuit, and a memory 46 coupled to the processor circuit 44. The memory 46 includes machine-readable computer program instructions that, when executed by the processor circuit, cause the processor circuit to perform some of the operations depicted described herein.

As shown, the remote device 200 includes a communication interface 42 (also referred to as a network interface) configured to provide communications with other devices. The remote device 200 also includes a processor circuit 44 (also referred to as a processor) and a memory circuit 46 (also referred to as memory) coupled to the processor circuit 44. According to other embodiments, processor circuit 44 may be defined to include memory so that a separate memory circuit is not required.

As discussed herein, operations of the remote device 200 may be performed by processing circuit 44 and/or communication interface 42. For example, the processing circuit 44 may control the communication interface 42 to transmit communications through the communication interface 42 to one or more other devices and/or to receive communications through network interface from one or more other devices. Moreover, modules may be stored in memory 46, and these modules may provide instructions so that when instructions of a module are executed by processing circuit 44, processing circuit 44 performs respective operations (e.g., operations discussed herein with respect to example embodiments).

Figure 7:
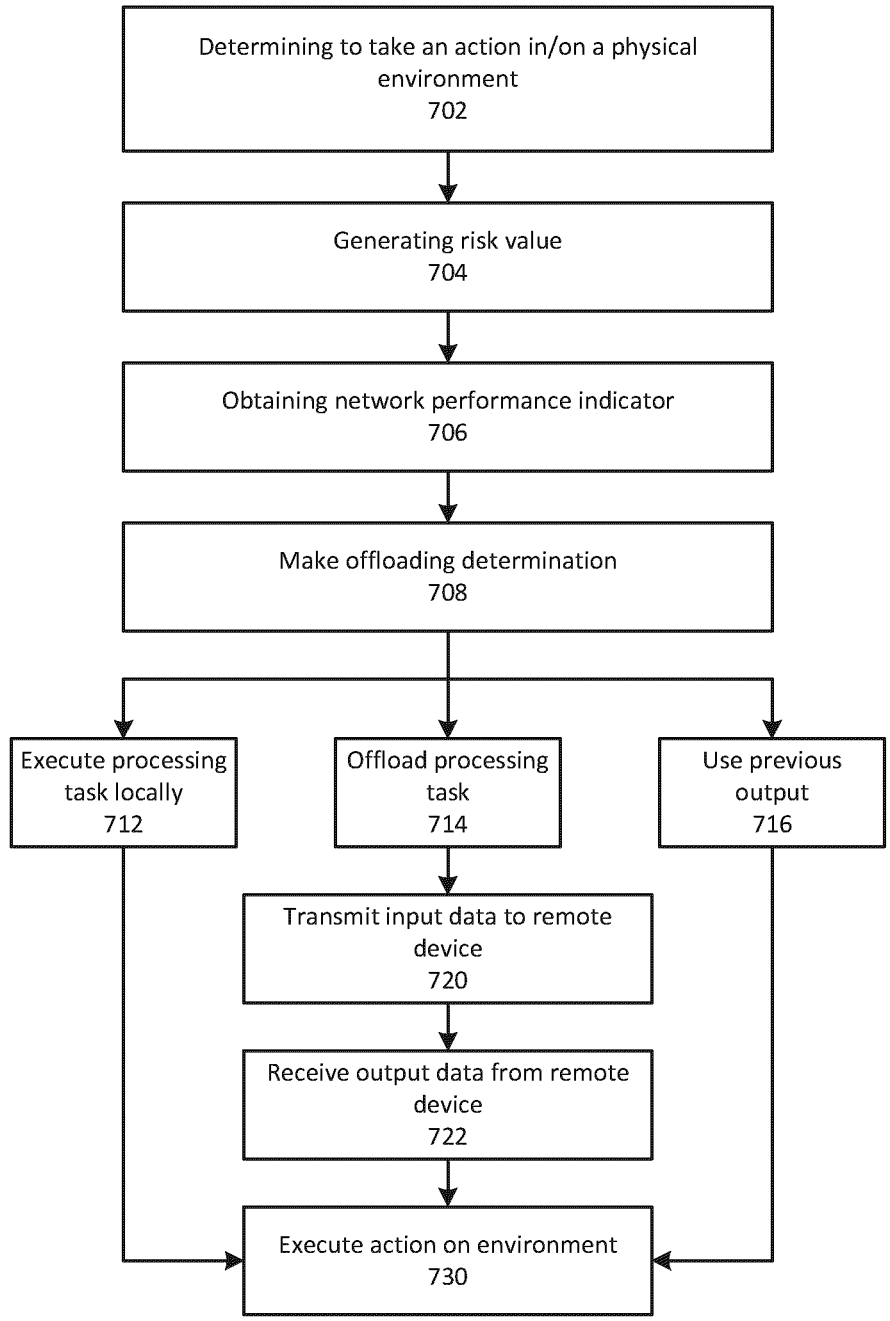
FIG. 7 illustrates operations of an autonomous device according to some embodiments.

FIG. 7 illustrates operations of an autonomous device 110 according to some embodiments. As shown therein, a method of operating an autonomous device 110 that interacts with a physical environment includes determining (block 702) to take an action on the physical environment, where the action is based on an output of a computing task. The autonomous device 110 generates a risk level that estimates a risk of physical harm associated with taking the action within the physical environment (block 704) and obtains a performance indicator of a communication network between the autonomous device and a remote computing device (block 706). The autonomous device 110 determines (block 708), based on the risk level and the performance indicator, whether to offload the computing task to the remote computing device (block 714) or to perform the computing task locally (block 712). In some embodiments, instead of offloading the computing task or performing the computing task locally, the autonomous device 110 may decide to use a previous output of the computing task for taking the action on the physical environment (block 716).

In response to determining to offload the computing task to the remote computing device 200, the autonomous device 110 transmits task input data to the remote computing device (block 720), and receives task output data from the remote computing device (block 722).

The autonomous device 110 then takes the action on the physical environment based on the task output data received from the remote computing device, the task output data generated locally or the previous task output data (block 730).

Figure 8:
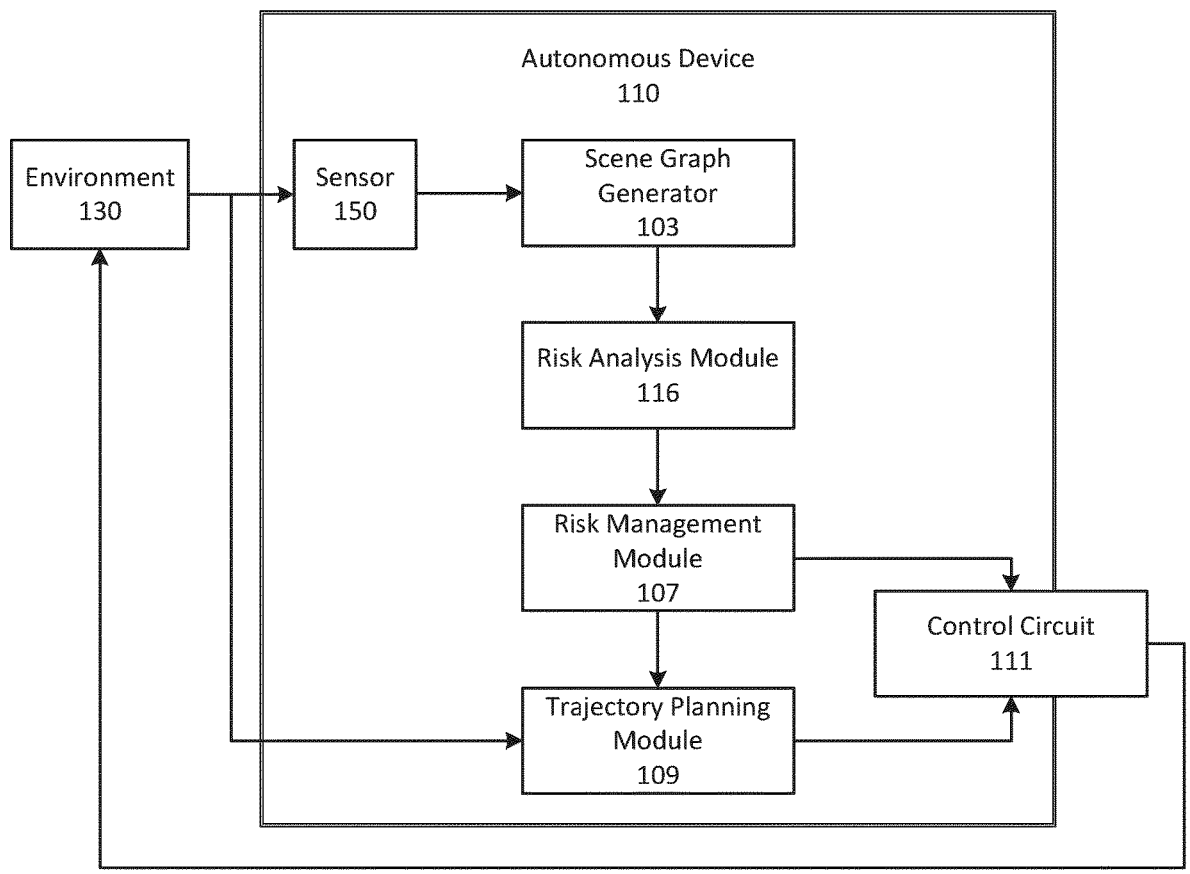
FIG. 8 illustrates additional aspects of an autonomous device in accordance with some embodiments.
Figure 9:
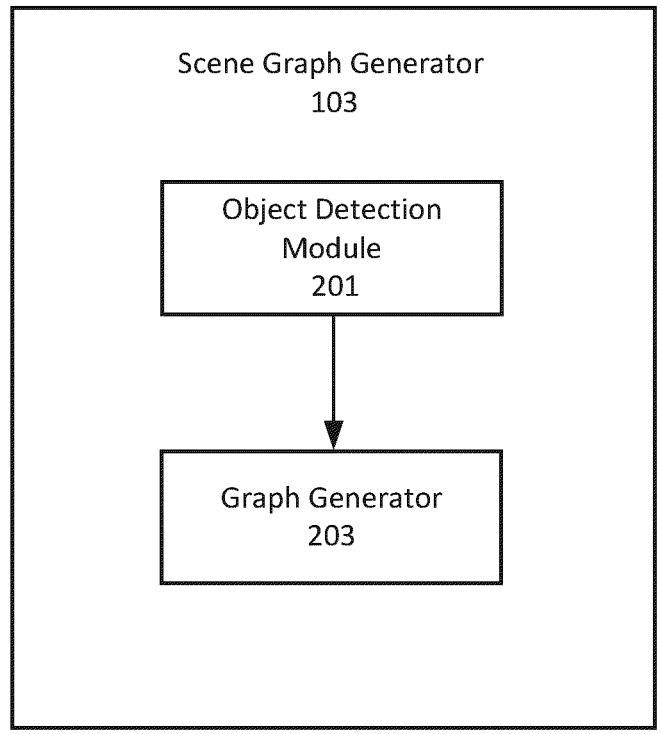
FIG. 9 illustrates a scene graph generator.

Generation of the risk level by the risk analysis module 116 will be described in more detail with reference to FIGS. 8-10. In particular, FIG. 8 illustrates further elements of a device 110 (also referred to as an autonomous device, agent or robot) that operates in an environment 130. The device 110 that includes a risk management module 107 for controlling actions of the device 110 based on a risk level generated by the risk analysis module 116. The device 110 also includes a scene graph generator 103, a trajectory planner module 109, and a control circuit 111.

The device 110 may perform its task(s) by navigating through environment 130 (e.g., a warehouse). Device 110 may follow a certain trajectory generated by a trajectory planner module 109 that knows a map of environment 130. However, in an actual operation, device 110 may work together with other elements such as other robots and humans in environment 130. An obstacle around the path of device 110 may create a potential hazard, both to device 110 and to the obstacle. Thus, a risk management module 107 may be implemented to reduce potential hazards that may occur.

The device 110 may monitor and take measurements of environment 130 through an exteroceptive sensor 150 and use the measurements to build a semantic and contextual representation of the environment, such as a scene graph. Device 110 may include a scene graph generator 103 for building the scene graph. The representation may be used by risk analysis module 116 to evaluate a risk level associated with each obstacle in environment 130. Risk management module 107 may determine risk mitigation or reduction that can be used to calculate a control for device 110 that may reduce the risk. Measurements obtained by the exteroceptive sensor 150 (e.g., camera, LIDAR, etc.) of the environment 130 proximate robot(s) 110 may be sent to scene graph generator 103 which may include a computer vision system that extracts objects from the sensor data and builds a semantic representation of the environment. Objects from the scene graph may be analyzed and evaluated by risk analysis module 116 for their corresponding risk level.

The scene graph and the risk levels may be sent to risk management module 107. Risk management module 107 may include one or more processors (as described in more detail below) which may execute a RL algorithm to calculate a current state of device 110 and a reward. Risk management module 107 may formulate the state and reward to minimize or reduce a potential risk. For example, the at least one processor of risk management module 107 may execute a RL algorithm to calculate a scale of wheel speeds for device 110 for reducing a potential risk.

Meanwhile, at least one processor of trajectory planner module 109 of device 110 may compute a path and a velocity that device 110 may follow to reach a certain object/target. At least one processor of control circuit 111 may combine the speed scale and the trajectory to compute movements that device 110 may perform in environment 130. Interaction with environment 130 may be performed in a continuous loop until device 110 achieves a certain target.

As discussed above, a representation of environment 130 may be included in a scene graph. A scene graph is a graph structure that may be effective for representing physical and contextual relations between objects and scenes. A potential advantage of a scene graph may be its level of interpretability by both machines and humans. A scene graph also may store information about an object's properties such as size, distance from the observer, type, velocity, etc.

A scene graph may represent objects in the environment 130. The scene graph may include information about an object's properties. Information about an object's properties may be used as an input to risk management module 107 and risk analysis node 116.

To construct a scene graph, measurements of environment 130 may be processed through an object detection method and the object properties may be extracted. FIG. 9 illustrates a process of scene graph construction. Referring to FIG. 9, scene graph generator 103 may include an object detection module 201 and a graph generator module 203. Object detection module 201 may detect objects in the field of view of device 110. Object detection module 201 may extract properties of one or more objects in environment 130. Graph generator module 203 may organize information from object detector module 201 in a semantic and contextual way.

A structure of a scene graph may be formed by nodes that may represent the objects that are in the field of view of device 110, and the edges may represent a semantic relationship between these objects. An example of a scene graph structure 300 dynamically generated by a device 110 in or proximate a warehouse environment 130 is illustrated in FIG. 10.

Figure 10:
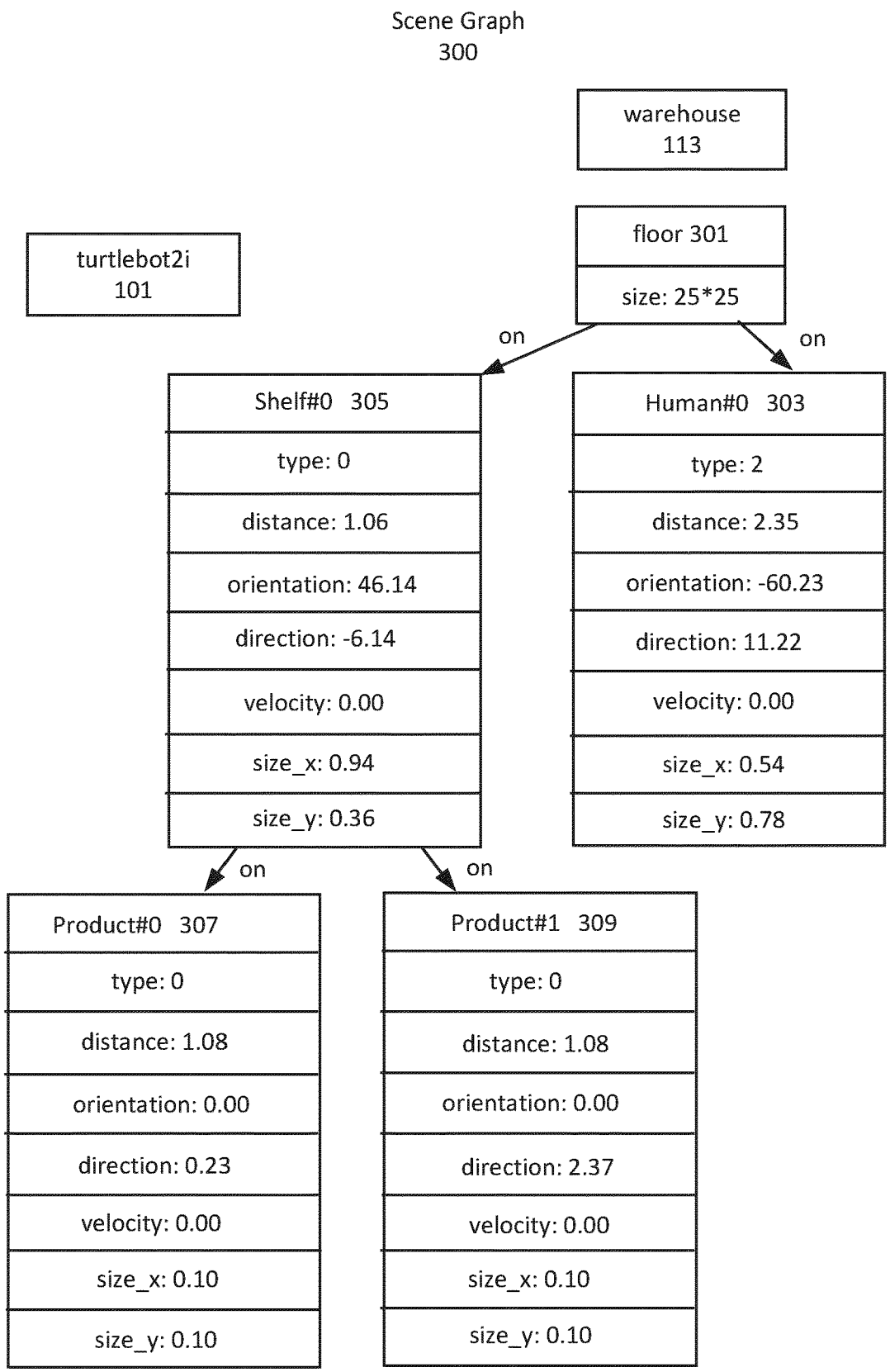
FIG. 10 illustrates an exemplary scene graph representation generated by an autonomous device in a warehouse environment.

Referring to FIG. 10, warehouse 130 is a root node of scene graph structure 300. Floor 301 is a child node of warehouse node 130. Floor 301 is an element that connects objects in the scene. Objects detected by device 110 are depicted below the floor node 301 and an edge of floor node 301 is labeled with "on", which represents the placement of two exemplary objects on floor 301. Human 303 and shelf 305 are two objects depicted as grandchildren nodes "on" floor node 301. Additional objects detected by device 110 are depicted below shelf node 305 and an edge of shelf node 305 is labeled with "on", which represents the placement of two exemplary products on shelf 305. Product 307 and product 309 are depicted as great grandchildren nodes "on" shelf node 305. With scene graph structure 300, risk management module 107 may use the contextual information provided by scene graph structure 300 for risk assessment and to generate control parameters with respect to each object in scene graph structure 300.

Still referring to FIG. 10, each node may have property attributes (also referred to as environment parameters). For example, floor node 301 has a size attribute of 25 meters by 25 meters. Human node 303 has seven attributes: a type attribute (e.g., type 2 for human), a distance attribute (e.g., 2.35 meters from a surface of device 110), an orientation attribute (e.g., −60.23° from face of human 303 to device 110), a direction attribute (e.g., 11.22° from a font surface of device 110 to human 303), a velocity attribute (e.g., velocity of human 303 is 0.00 meters per second), a size attribute in the x direction (e.g., 0.54 meters), and a size attribute in the y direction (e.g., 0.78 meters). Type attribute of objects may include, but is not limited to, three types (0 for a static object, 1 for a dynamic object, and 2 for a human).

The scene graph generator 103 may convert the measurements from the sensors to generate a scene graph structure of the environment 130. The scene graph structure may be used as an input to the risk analysis circuit 116 to calculate a risk level of each object in the scene graph structure.

The risk level of an environment may be determined from the representation of the environment based on determining discrete values for information from the representation of the environment. The discrete values for information may include at least one of a current direction of the autonomous device; a current speed of the autonomous device; a current location of the autonomous device; a distance of the at least one obstacle from a safety zone in the set of safety zones for the autonomous device; a direction of the at least one object relative to a surface of the autonomous device; and a risk level for the at least one object based on a classification of the at least one object. The risk level for the at least one object based on the classification of the at least one object is input to the risk management node from a risk analysis module that assigns the risk level based on the discrete values. The classification of the object may include, but is not limited to, an attribute parameter identifying at least one object as including (but not limited to), for example, a human, an infrastructure, another autonomous device, or a vehicle.

Abbreviations

AGV Automated Guided Vehicle
QoS Quality of Service
KPI Key Performance Indicator
RTT Round-Trip Time
DRL Deep Reinforcement Learning
DQN Deep Q-Network (DRL algorithm)
CEM Cross-Entropy Method (DRL algorithm)
SARSA State-Action-reward-State-Action (DRL algorithm)
NIC Network Interface Card
LIDAR Light Detection and Ranging In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components, or functions but does not preclude the presence or addition of one or more other features, integers, elements, steps, components, functions, or groups thereof.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a device that interacts with a physical environment, the method comprising:
   determining to take an action on the physical environment, wherein the action is based on an output of a computing task;
   generating a risk level that estimates a risk of physical harm associated with taking the action within the physical environment;
   obtaining a performance indicator of a communication network between the device and a remote computing device;
   determining, based on the risk level and the performance indicator, whether to offload the computing task to the remote computing device or to perform the computing task locally,
   wherein the deciding whether to offload the computing task to the remote computing device or to perform the computing task locally is performed using a reinforcement learning agent that evaluates a reward for offloading the computing task to the remote device, wherein the reward is calculated based on a latency reward $r_l$, that is based on an amount of time needed to perform the computing task, an energy reward $r_e$ that is based on an amount of energy needed to perform the computing task, and an accuracy reward $r_a$ that is based on an accuracy of the computing task, and
   wherein the latency reward $r_l$ is defined as:

$$r_l = w_l \times 1/L$$

where $w_l$ is a weight that indicates a relative importance of the latency reward compared to other reward factors and L is a total latency associated with performing the computing task, including a communication latency and an execution latency; and in response to determining to offload the computing task to the remote computing device, transmitting task input data to the remote computing device, receiving task output data from the remote computing device, and taking the action on the physical environment based on the task output data received from the remote computing device.

2. The method of claim 1, further comprising:
obtaining a set of task input data for performing the computing task;
comparing the task input data for performing the computing task with a previous set of task input data for performing the same computing task; and
deciding to use a set of task output data that was generated based on the previous set of task input data instead of offloading the computing task to the remote device or performing the computing task locally.

3. The method of claim 1, wherein the performance indicator of the communication network comprises at least one of a throughput, a round-trip-time, a bandwidth and a latency.

4. The method of claim 1, wherein the communication latency comprises a time required to transmit a set of task input data to a task processing module that will perform the computing task and to receive a set of output data from the task processing module, and wherein the execution latency comprises a time required for the task processing module to complete the computing task.

5. A method of operating a device that interacts with a physical environment, the method comprising:
determining to take an action on the physical environment, wherein the action is based on an output of a computing task;
generating a risk level that estimates a risk of physical harm associated with taking the action within the physical environment;
obtaining a performance indicator of a communication network between the device and a remote computing device;
determining, based on the risk level and the performance indicator, whether to offload the computing task to the remote computing device or to perform the computing task locally,
wherein the deciding whether to offload the computing task to the remote computing device or to perform the computing task locally is performed using a reinforcement learning agent that evaluates a reward for offloading the computing task to the remote device, wherein the reward is calculated based on a latency reward $r_l$, that is based on an amount of time needed to perform the computing task, an energy reward $r_e$ that is based on an amount of energy needed to perform the computing task, and an accuracy reward $r_a$ that is based on an accuracy of the computing task, and
wherein the energy reward is defined as:

$$r_e = w_e \times 1/E$$

where E is an amount of energy spent to perform the computing task and $w_e$ is a weight that indicates a relative importance of the energy reward compared to other reward factors; and in response to determining to offload the computing task to the remote computing device, transmitting task input data to the remote computing device, receiving task output data from the remote computing device, and taking the action on the physical environment based on the task output data received from the remote computing device.

6. The method of claim 1, wherein the accuracy reward $r_a$ is equal to zero if the computing task is performed locally and is equal to a non-zero number if the computing task is performed by the remote computing device.

7. A method of operating a device that interacts with a physical environment, the method comprising:
determining to take an action on the physical environment, wherein the action is based on an output of a computing task;
generating a risk level that estimates a risk of physical harm associated with taking the action within the physical environment;
obtaining a performance indicator of a communication network between the device and a remote computing device;
determining, based on the risk level and the performance indicator, whether to offload the computing task to the remote computing device or to perform the computing task locally,
wherein the deciding whether to offload the computing task to the remote computing device or to perform the computing task locally is performed using a reinforcement learning agent that evaluates a reward for offloading the computing task to the remote device, wherein the reward is calculated based on a latency reward $r_l$, that is based on an amount of time needed to perform the computing task, an energy reward $r_e$ that is based on an amount of energy needed to perform the computing task, and an accuracy reward $r_a$ that is based on an accuracy of the computing task, and
wherein the reward is calculated as:

$$\text{reward} = (\text{risk}_{value} + 1) \times (r_l + r_a) + r_e$$

where $\text{risk}_{value}$ is the risk level; and in response to determining to offload the computing task to the remote computing device, transmitting task input data to the remote computing device, receiving task output data from the remote computing device, and taking the action on the physical environment based on the task output data received from the remote computing device.

8. The method of claim 1, wherein the reward is further calculated based on temporal coherence reward that is based on a similarity between a previous task input to a current task input.

9. A method of operating a device that interacts with a physical environment, the method comprising:
determining to take an action on the physical environment, wherein the action is based on an output of a computing task;
generating a risk level that estimates a risk of physical harm associated with taking the action within the physical environment;
obtaining a performance indicator of a communication network between the device and a remote computing device;
determining, based on the risk level and the performance indicator, whether to offload the computing task to the remote computing device or to perform the computing task locally,
wherein the deciding whether to offload the computing task to the remote computing device or to perform the computing task locally is performed using a reinforcement learning agent that evaluates a reward for offloading the computing task to the remote device, wherein the reward is calculated based on a latency reward $r_l$, that is based on an amount of time needed to perform the computing task, an energy reward $r_e$ that is based on an amount of energy needed to perform the computing task, and an accuracy reward $r_a$ that is based on an accuracy of the computing task, wherein the reward is further calculated based on temporal coherence reward that is based on a similarity between a previous task input to a current task input, and wherein the temporal coherence reward is calculated as:

$$r_t = (\text{temporal}_{coherence}^4 - 1) \times \text{reward}_{partial}.$$

where $\text{temporal}_{coherence}$ is the temporal coherence and $\text{reward}_{partial}$ is a reward calculated based on the risk level, the latency reward, the accuracy reward and the energy reward; and in response to determining to offload the computing task to the remote computing device, transmitting task input data to the remote computing device, receiving task output data from the remote computing device, and taking the action on the physical environment based on the task output data received from the remote computing device.

10. The method of claim 8, wherein the previous task input and the current task input comprise images of the physical environment.

11. The method of claim 10, wherein the temporal coherence is calculated based on mutual information of the images of the physical environment.

12. The method of claim 11, wherein the mutual information of the images of the physical environment is obtained by calculating an entropy of each image and a joint entropy of the images and subtracting the entropy of each image from the joint entropy.

13. The method of claim 1, wherein generating the risk level comprises:
  detecting objects within the physical environment;
  generating a semantic representation of the physical environment, wherein the semantic representation of the physical environment includes properties of the detected objects;
  classifying the detected objects; and
  generating the risk level based on the properties and classifications of the objects.

14. The method of claim 13, wherein the semantic representation comprises a scene graph.

* * * * *